UNITED STATES PATENT OFFICE.

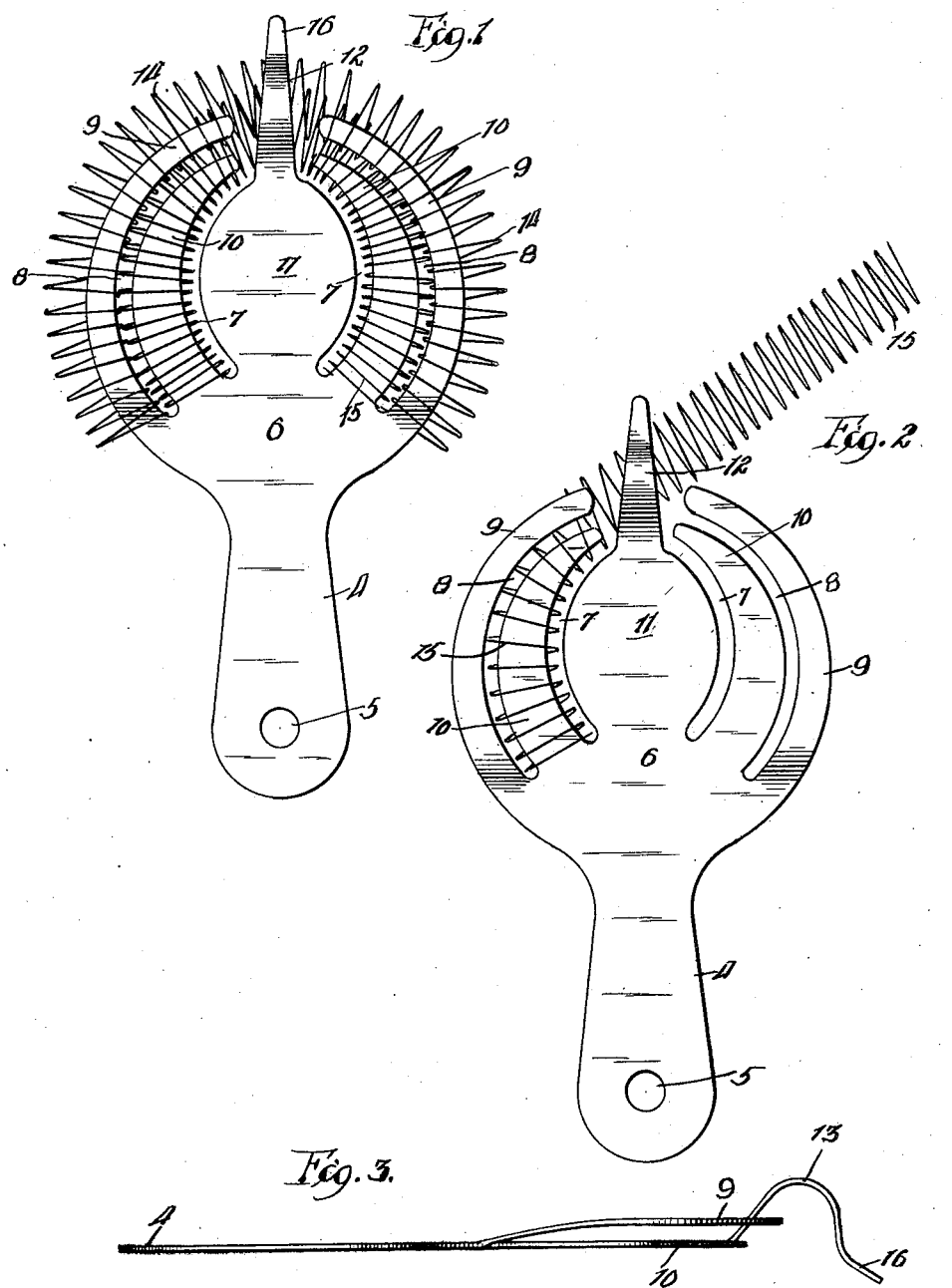

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

LIQUID-STRAINER.

No. 897,005.    Specification of Letters Patent.    Patented Aug. 25, 1908.

Application filed January 16, 1908. Serial No. 411,189.

*To all whom it may concern:*

Be it known that I, DOSIER H. MOSTELLER, a citizen of the United States, residing at Chicago, in the county of Cook and State of Illinois, have invented certain new and useful Improvements in Liquid-Strainers, of which the following is a specification.

My improved device is especially adapted to be used in connection with the making and preparation of drinks, particularly at bars and soda fountains.

A source of considerable inconvenience and annoyance to drink dispensers is the fact that strainers of different sizes ordinarily have to be employed for large and small glasses, and when thus utilized do not give satisfactory results.

It is the primary object of my invention to construct a liquid strainer in such manner as that it is capable of being effectively used as well, for example, in connection with a small whisky glass, as with the ordinary liquid shaker which usually has a much larger mouth.

In the drawings illustrating the invention Figure 1 is a side elevation of my improved liquid strainer ready for use; Fig. 2 a similar view with the helical springs partly removed from the body thereof; and Fig. 3 a side elevation of the strainer body with the springs removed therefrom.

My improved liquid strainer, as illustrated, comprises a handle 4 of the usual formation, having an opening 5 near its outer end, said handle, at its inner end, merging into an approximately round strainer body 6. The body of this liquid strainer has outer and inner recesses 7 and 8 respectively formed therein, which, as shown, are arranged and disposed eccentrically with respect to the general curvature of the strainer body.

Outer companion curved tongues 9 which are slightly tapering are preferably formed integral with the strainer body 6. Inner companion curved tongues 10, which are likewise of tapering formation are also formed integral with the strainer body 6. A substantially oval shaped center piece 11 is formed, as shown, adjacent the recesses 7 aforesaid which, for the greater part, encircle the same. This substantially oval shaped center piece 11, at its outer end, merges into a curved clip member 12 which, as shown in Fig. 3, is bent back, as at 13, to provide suitable means for properly keeping the upper and lower helical springs 14 and 15 respectively in proper engagement with the strainer body. The clip member 12 thence extends down and outwardly, forming, in effect, a tongue 16 which is adapted to contact the rim of the liquid receptacle during the straining operation. Fig. 3 especially illustrates the peculiar manner in which the tongues are formed. It will be noted that the outer companion tongues are bent upwardly, so that the inner and outer tongues aforesaid lie in different planes with respect to one another. This arrangement of parts permits the lower helical spring 15 to be readily inserted in place about the inner tongues aforesaid as well as to enable the upper helical spring 14 to be inserted in its normal position upon the outer companion tongues, the same as illustrated being positively retained in place by reason of the clip member 12.

From the foregoing description it will be apparent that the device is constructed with especial regard to permitting the helical springs to be inserted and withdrawn as desired. The formation of the strainer body is such as to permit the same to be effectually used, for instance, with a small whisky glass, in which case the liquid will pass through the recesses 7, the pulp, seeds and other impurities being caught in the mesh of the inner lower helical spring 15. When straining liquid into a receptacle of larger proportions, as for example, an ordinary liquid shaker, it will be seen that the liquid is permitted to pass off through the recesses 7 and 8 respectively, the pulp, seeds, and other impurities being caught and held in the meshes of the upper and lower helical springs 14 and 15 respectively. It is furthermore apparent that, owing to the peculiar construction of the outer and inner companion tongues which, as illustrated, lie in different planes with respect to one another, as well as to the helical springs which serve as suitable meshes to intercept the seeds and pulp during the straining operation, that the device is especially suitable for extensive and universal use in drink dispensing establishments, and that, owing to the simplicity of construction, the parts may be cleaned and kept in proper sanitary condition.

What I claim as new and desire to secure by Letters Patent is:

1. In a strainer, a body having a pair of outer tongues and a pair of inner tongues, the outer and inner tongues being in different planes with respect to one another, and coiled springs adapted to be retained upon the tongues, substantially as described.

2. In a strainer, a handle terminating in a body having a pair of outer tongues and a pair of inner tongues, the outer and inner tongues being in different planes with respect to one another, and helically coiled springs adapted to be retained upon the tongues, substantially as described.

3. In a strainer, a body having a pair of outer tongues, a pair of inner tongues and a center piece, the outer and inner tongues being in different planes with respect to one another, a clip member secured to the center piece, and coiled springs adapted to be retained upon the tongues, substantially as described.

4. In a strainer, a handle terminating in a body, said body having a pair of outer tongues, a pair of inner tongues and a center piece, the outer and inner tongues being in different planes with respect to one another, a clip member secured to the center piece, and coiled springs adapted to be retained upon the tongues, substantially as described.

5. In a strainer, a handle terminating in a body, said body having a pair of outer tongues, a pair of inner tongues and a center piece, the outer and inner tongues being in different planes with respect to one another and the recesses between said tongues being proportioned for straining liquid into drinking vessels of varying proportions, and coiled springs adapted to be retained upon the tongues, substantially as described.

6. In a strainer, a handle terminating in a body, said body having a pair of outer tongues, a pair of inner tongues and a center piece, the outer and inner tongues being in different planes with respect to one another and the recesses between said tongues being proportioned for straining liquid into drinking vessels of varying proportions, a clip member secured to the center piece, and helically coiled springs adapted to be retained upon the tongues, substantially as described.

DOSIER H. MOSTELLER.

Witnesses:
WALKER BANNING,
SAMUEL W. BANNING.